US008000988B1

(12) United States Patent
Bezanson et al.

(10) Patent No.: US 8,000,988 B1
(45) Date of Patent: Aug. 16, 2011

(54) SELECTING SHIPPING METHODS DEPENDENT ON A DYNAMIC MODEL OF SHIPPING ACTIVITY

(75) Inventors: Llewellyn W. Bezanson, North Bend, WA (US); Keith B. Ligon, Seattle, WA (US); Girish S. Lakshman, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 1395 days.

(21) Appl. No.: 11/506,721

(22) Filed: Aug. 18, 2006

(51) Int. Cl.
*G06F 17/60* (2006.01)
(52) U.S. Cl. ............................................. 705/7
(58) Field of Classification Search .................. 705/7
See application file for complete search history.

(56) References Cited

U.S. PATENT DOCUMENTS

| | | | | |
|---|---|---|---|---|
| 5,450,317 | A * | 9/1995 | Lu et al. ........................... | 705/10 |
| 5,485,369 | A * | 1/1996 | Nicholls et al. .................... | 705/9 |
| 5,617,342 | A * | 4/1997 | Elazouni ........................... | 703/6 |
| 5,897,629 | A * | 4/1999 | Shinagawa et al. .............. | 706/13 |
| 5,910,896 | A * | 6/1999 | Hahn-Carlson ................ | 700/231 |
| 5,940,816 | A * | 8/1999 | Fuhrer et al. ..................... | 706/13 |
| 5,946,212 | A | 8/1999 | Bermon et al. | |
| 5,953,706 | A * | 9/1999 | Patel ................................. | 705/6 |
| 6,035,289 | A * | 3/2000 | Chou et al. ................... | 705/36 R |
| 6,035,291 | A * | 3/2000 | Thiel ............................. | 705/408 |
| 6,532,454 | B1 | 3/2003 | Werbos | |
| 6,611,735 | B1 | 8/2003 | Henly et al. | |
| 6,879,962 | B1 * | 4/2005 | Smith et al. ...................... | 705/22 |
| 6,915,268 | B2 * | 7/2005 | Riggs et al. ........................ | 705/7 |
| 6,934,594 | B2 * | 8/2005 | Loring et al. ................. | 700/100 |
| 6,934,931 | B2 | 8/2005 | Plumer et al. | |
| 7,054,706 | B2 | 5/2006 | Kempf et al. | |
| 7,295,990 | B1 * | 11/2007 | Braumoeller et al. ............ | 705/7 |
| 7,385,529 | B2 * | 6/2008 | Hersh et al. .................... | 340/988 |
| 7,398,132 | B2 * | 7/2008 | Steinhilper .................... | 700/111 |
| 7,499,766 | B2 * | 3/2009 | Knight et al. ................. | 700/107 |
| 7,702,411 | B2 * | 4/2010 | Bagchi et al. ................. | 700/100 |
| 7,739,099 | B2 * | 6/2010 | Liu et al. ......................... | 703/22 |
| 7,755,518 | B2 * | 7/2010 | Hersh et al. .................... | 340/988 |
| 7,765,120 | B2 * | 7/2010 | Yadappanavar et al. .......... | 705/7 |
| 7,844,481 | B2 * | 11/2010 | Hilbush et al. ............... | 705/7.13 |
| 2002/0019759 | A1 * | 2/2002 | Arunapuram et al. ............ | 705/7 |

(Continued)

OTHER PUBLICATIONS

Kuo, Ching-Chung et al., An automated system for motor carrier selection Industrial Management and Data Systems, vol. 103, No. 7, 2003.*

(Continued)

*Primary Examiner* — Scott L Jarrett
(74) *Attorney, Agent, or Firm* — Robert C. Kowert; Meyertons, Hood, Kivlin, Kowert & Goetzel, P.C.

(57) ABSTRACT

A method and system for selecting a shipping method dependent upon a dynamic model of shipping activity. In one embodiment, a method may include detecting a given shipment event for which one of a plurality of shipping methods is to be selected, determining a current output state of a discrete event model representative of shipping method selections for one or more previous shipment events, and in response to detecting the given shipping event, producing a selection of a particular one of the plurality of shipping methods that mathematically optimizes an objective function, wherein the objective function is dependent on a cost of shipping associated with the given shipment event and on a weighted deviation between the current output state of the discrete event model and a target output state of the discrete event model.

29 Claims, 7 Drawing Sheets

U.S. PATENT DOCUMENTS

| | | | |
|---|---|---|---|
| 2002/0032573 A1* | 3/2002 | Williams et al. | 705/1 |
| 2002/0095347 A1* | 7/2002 | Cummiskey | 705/26 |
| 2003/0046130 A1 | 3/2003 | Golightly et al. | |
| 2003/0046133 A1* | 3/2003 | Morley et al. | 705/8 |
| 2004/0054570 A1* | 3/2004 | Streetman | 705/8 |
| 2004/0193555 A1* | 9/2004 | Chew | 705/410 |
| 2005/0015164 A1* | 1/2005 | Loring et al. | 700/97 |
| 2005/0209913 A1* | 9/2005 | Wied et al. | 705/12 |
| 2006/0247939 A1 | 11/2006 | An et al. | |

OTHER PUBLICATIONS

Peterkofsky, Roy, Oracle World—Transportation Planning Oracle World, 2004.*

Oracle Transportation Planning 11i.10 data sheet Oracle, 2004.*

Jung, June Young et al., A simulation based optimization approach to supply chain management under demand uncertainty COmputers and Chemical Engineering, vol. 28, 2004.*

Schineller, Bill, Joe's Juggling Act—A Transportation Manager's Nightmare OR./MS Today, Dec. 1998.*

Ruiz-Torres, Alex et al., Simulation Based Approach to Study the Interatction of Scheduling and Routing on a Logistics Network, Proceedings of the 1997 Winter Simulation Conference, 1997.*

Threatte, Kermit et al., Tactical Shipping and Scheduling at Polaroid with Dual Lead-Times MIT, 2002.*

Bardi, Edward J. et al., Motor Carrier Selection in a Deregulated Environment Transportation Journal, 1989.*

Schriber, Thomas J. et al., Inside Discrete-Event Simulation Software: How it works and Why it matters Proceedings of the 1997 Winter Simulation Conference, 1997.*

Discrete Event Simulation definition Retreived from Wikipedia.org Sep. 27, 2010.*

Linear Programming definition Retreived from Wikipedia.org Sep. 27, 2010.*

Faranca, Anthony G., Complex system analysis through discrete event simulatino Massachusetts Institute of Technology, 2004, Abstract.*

Richards et al., "Mixed-integer programming for control," American Control Conference, 2005, 8 pages.

Braun et al., "A model predictive control framework for robust management of multi-product, multi-echelon demand networks," NSF-DMII Grantees Conference, 2002, 15 pages.

Sarjoughian et al., "Hybrid discrete event simulation with model predictive control for semiconductor supply-chain manufacturing," Proceedings of the 2005 Winter Simulation Conference, 11 pages.

* cited by examiner

SELECTING SHIPPING METHODS DEPENDENT ON A DYNAMIC MODEL OF SHIPPING ACTIVITY

BACKGROUND OF THE INVENTION

1. Field of the Invention

This invention relates to transit logistics and, more particularly, to the selection of shipping methods for shipments under dynamically modeled constraints.

2. Description of the Related Art

In the course of commerce, manufacturing and other business activities, different kinds of material often need to be conveyed from one location to another. For example, a global, web-based or brick-and-mortar retail sales operation may routinely ship packages containing customer orders around the world. Similarly, a distributed manufacturing operation may ship components or partially-assembled items from one manufacturing site to another for continued processing. Materials conveyance may also occur on a smaller scale, such as from a materials receiving area of a large, complex manufacturing site to one of a number of processing areas within the site.

There are often a number of different ways or methods to effect shipment from a source to a destination. For example, one may choose from different shippers, such as different common carriers that may accept and transport shipments for a fee. Further, individual carriers may offer a number of different shipment options ranging from expedited service (e.g., overnight air delivery) to economy service (e.g., ground delivery). In some circumstances, possible shipping methods may also encompass private, leased or contract carriers as well as use of an enterprise's own delivery resources.

Selection of a particular shipping method from a number of options may present a complex problem including many constraints. Depending on the nature of the shipment and/or the status or capacity of a carrier, certain methods may be ineligible for selection. For example, if the shipment does not satisfy a carrier's constraints on package dimensions, shape, weight or contents (e.g., liquid, fragile, perishable or hazardous contents), that carrier may refuse to accept the shipment. Of eligible shipping methods, different methods may have different economic, time-based or other costs, which method selection may attempt to optimize. However, complex cost relationships among different shipping methods may complicate per-shipment cost optimization. For example, under the constraints of a volume shipping arrangement with a particular carrier, a cost of shipping a particular package may depend not only on characteristics of the particular package, but also information about other packages that have been or may be tendered to the particular carrier.

SUMMARY

Various embodiments of a method and system for selecting a shipping method dependent upon a dynamic model of shipping activity are disclosed. Generally, selection of a shipping method for a given shipment may depend on a discrete event model that may be configured to represent shipping method selections for past shipments. The state of the model, reflecting historical shipment behavior, may be accounted for in generating a shipping method selection for the given shipment. In particular, the selection may be produced such that it optimizes an objective or cost function, where the objective function takes into account a cost of shipping the given shipment as well as a difference between the current state of the event model and a desired or target state of the event model.

More specifically, in one embodiment, a method may include detecting a given shipment event for which one of several shipping methods is to be selected, and determining a current output state of a discrete event model representative of shipping method selections for one or more previous shipment events. In response to detecting the given shipping event, the method may further include producing a selection of a particular one of the plurality of shipping methods that mathematically optimizes an objective function. The objective function may be dependent on a cost of shipping associated with the given shipment event and on a weighted deviation between the current output state of the discrete event model and a target output state of the discrete event model.

Figure 1:
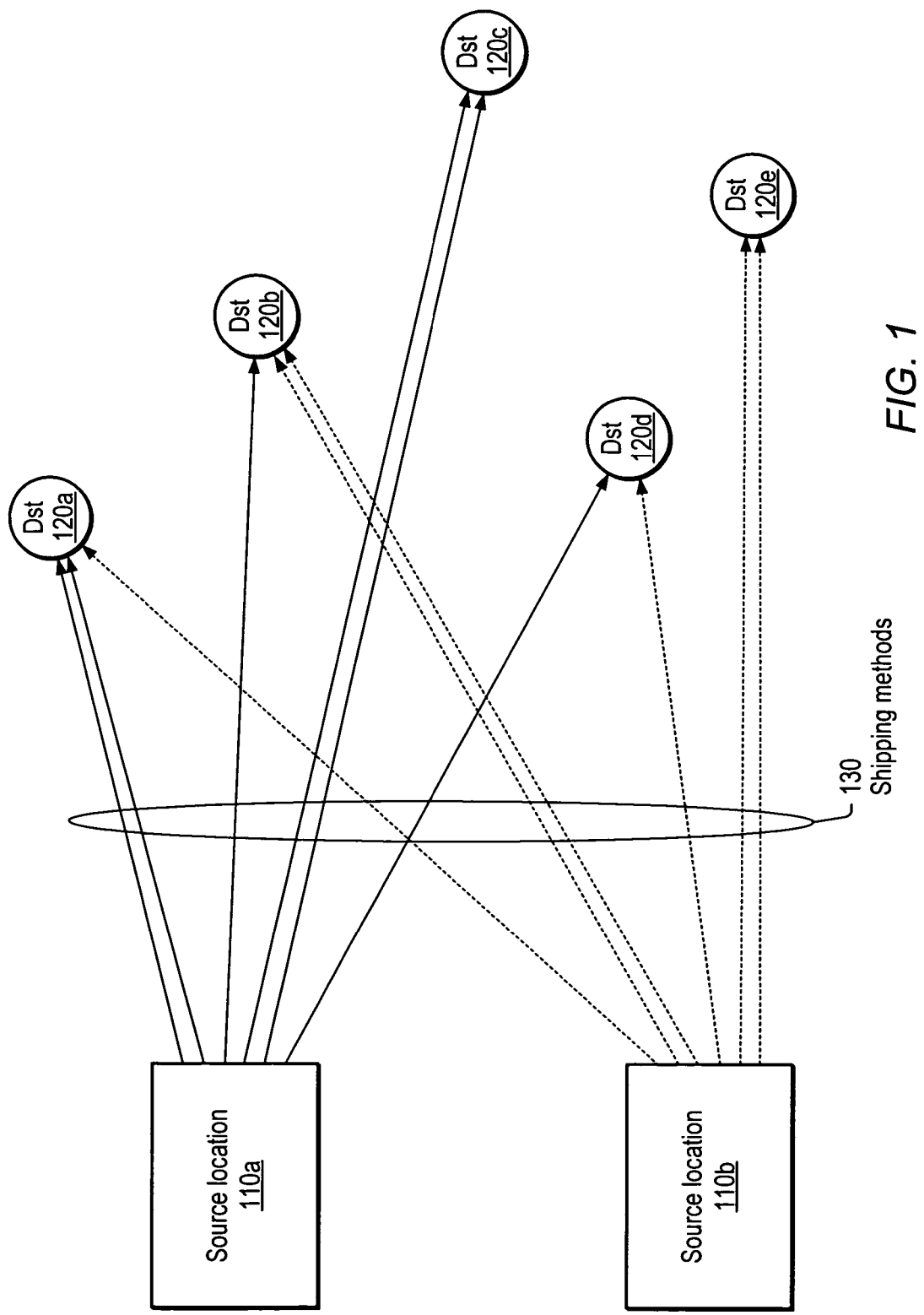
FIG. 1 is a block diagram illustrating one embodiment of source locations, destination locations and shipping methods between sources and destinations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As mentioned above, determining the best choice(s) of shipping methods for a particular shipment or package of goods may be complicated by constraints that involve historical and/or future shipments. For example, a given common carrier may offer a multiple-tier shipping rate structure in which lower rates are contingent upon receiving a certain absolute or relative volume of a shipper's shipments over a period of time. Below the volume threshold, other carriers may offer lower rates, while the given carrier may be most economical if the volume threshold is satisfied. If the shipping cost for a particular shipment is determined in isolation, without accounting for other shipments (e.g., neglecting volume), the given carrier may consistently appear more expensive than the others. Accordingly, the given carrier may not be chosen for an individual shipment. However, if the given carrier is consistently selected against in this fashion, the volume threshold requirement may never be actually satisfied, even though there may be a sufficient number of shipments to meet the requirement. In this case, a locally optimized decision (e.g., a decision based on minimizing the cost of a single shipment) may be globally suboptimal when considering shipments in the aggregate.

In some embodiments, enforcing a desired distribution of selections among shipping methods may be achieved through biasing the costs associated with the various methods. Referring to the above example, if the per-shipment costs of the other carriers are artificially biased to be higher than the low-volume rate of the given carrier, the given carrier may appear to be cheaper for a single shipment, and may correspondingly be selected. Provided that this decision is repeated for a sufficient number of shipments, the volume threshold will be satisfied and the given carrier will in fact represent the most economical choice for the group of shipments. However, such biasing of costs is an imprecise solution. Since the cost biases are static and thus independent of the actual state of shipments at any given time, this approach may perform suboptimally in instances where shipment state varies. For example, if during a particular period of time for measuring shipment volume there are insufficient shipments to satisfy the given carrier's volume requirement, static cost biasing may still result in selection of the given carrier even though, in view of the actual number of shipments, different selections may have been more economical.

In the following discussion, various methods and techniques are described for selecting shipping methods on the basis of a control policy based on a predictive process model. Such a model may be configured to take into account the state of historical as well as future shipments, and may be optimized for a desired distribution of shipment methods while accounting for economic costs of the selected methods. First, an overview of shipping methods between sources and destinations is provided. Next, the general architecture of a system that may be configured to select shipping methods for various shipments is discussed. Subsequently, methods for modeling the state of a system of shipments and for making shipping decisions based on such a model are considered, and an exemplary computer system that may be configured to implement the methods and techniques described herein is discussed. However, it is noted that this organization is intended to facilitate exposition, and the embodiments described herein are not limited by section headings or the order in which the sections are presented.

Sources, Destinations and Shipping Methods

In the embodiment of FIG. 1, a number of source locations 110a-b as well as a number of destination locations 120a-e are shown. Additionally, a number of shipping methods 130 between some of source locations 110 and destination locations 120 are shown. It is noted that in various embodiments, an arbitrary number of source locations 110, destination locations 120 and shipping methods 130 between them may be provided. For simplicity of reference, source locations 110 and destination locations 120 may also be referred to simply as sources 110 and destinations 120.

Generally speaking, a source location 110 may include any type of point of origin or departure for shipment of materials, and similarly a destination location 120 may include any type of intermediate or final destination point. For example, in one embodiment a source location 110 may include a warehouse or fulfillment center within which inventory may be stored and items may be selected and packaged for delivery to customers. A source location 110 may also include a third party shipper or drop shipper, e.g., a manufacturer, wholesaler or other party in possession of items, who may ship items upon receiving instructions to do so from a retailer or other party who is primarily responsible for managing the order. A destination location 120 may include, for example, a business or residential location identified by an address (e.g., a street address including a postal code). In other embodiments, source locations 110 and destination locations 120 may correspond to other types of facilities or locations, such as manufacturing plants, raw materials sources, product distributors or wholesalers, virtual or physical retailers, etc.

It is noted that neither source location 110 nor destination location 120 need represent the ultimate source or destination of an item in transit. For example, as described below in conjunction with the description of FIG. 2, in some embodiments multiple different modes or methods of transit may be used to convey materials from an originating source to a final destination. Thus, a destination location 120 with respect to one leg of transit, such as a common carrier's shipping hub, may serve as a source location 110 with respect to another leg of transit. Additionally, in some embodiments an entire supply chain for an item, from raw materials, manufacturing and distribution to final delivery to a customer may be modeled as a series of materials conveyance or shipments between source locations 110 and destination locations 120. For example, in the course of manufacturing an item or assembling an order including multiple different items, multiple different paths from different source locations 110 may correspond to the movement of raw materials or inventory throughout the supply chain. These paths may be modeled and tracked through the stage of assembly, packaging, delivery, etc., for example to coordinate just-in-time materials management, to meet manufacturing or shipping deadlines, or to meet other operational goals.

While in some embodiments, selection of a shipping method between a source 110 and a destination 120 may be performed at a fine level of granularity in which intermediate destinations 120 are discretely planned, in other embodiments it is contemplated that the detailed movements of the shipment between the source 110 and destination 120 may be transparent during the method selection. That is, selection of a shipping method may be performed on the basis of the source 110, desired destination 120, and shipping characteristics such as transit time and/or cost, while the detailed logistics of conveying the shipment may be left to the carrier that implements the selected method. It is also noted that in some embodiments, the role of a source location 110 and a destination location 120 may be reversed with respect to a given item in transit. For example, in some instances defective items or excess quantities may be returned from a given destination location 120 to the source location 110 from which they were received, or possibly to another source location 110.

As a practical matter, it may be inconvenient or undesirable to provide for conveyance of items from every source location 110 to every destination location 120. For example, a fulfillment center on the West Coast of the United States may be better suited in general to service shipments destined for western states and Asia, whereas a fulfillment center on the East Coast may be preferable for servicing shipments to the eastern United States and Europe. Correspondingly, in the embodiment of FIG. 1, multiple different shipping methods 130 are illustrated between some pairs of source locations 110 and destination locations 120, while no paths are illustrated between other pairs of source and destination locations. However, in principle it may generally be possible to convey an item from any given source location 110 to any given destination location 120 within some number of transit operations (e.g., via shipment to intermediate destinations 120, shipping hubs, etc.). Also, it is contemplated that in some embodiments, transshipment between two source locations 110 or two destination locations 120 may be performed. For example, inventory may be repositioned from one fulfillment center to another. For purposes of modeling and analysis, as noted above, a source location 110 may be modeled as a destination location 120 (or vice versa) under such circumstances.

Figure 2A:
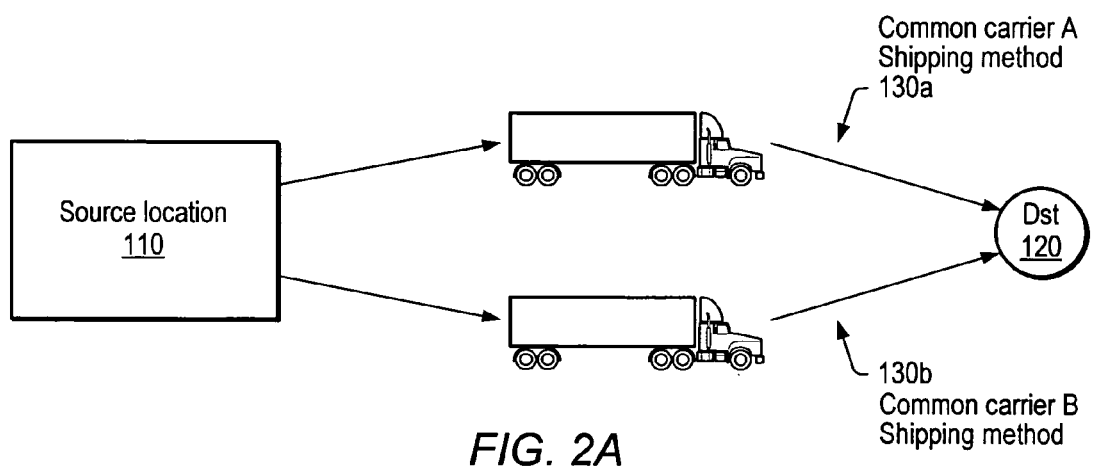
FIGS. 2A-B are block diagrams illustrating exemplary embodiments of shipping methods between source locations and destination locations.
Figure 2B:
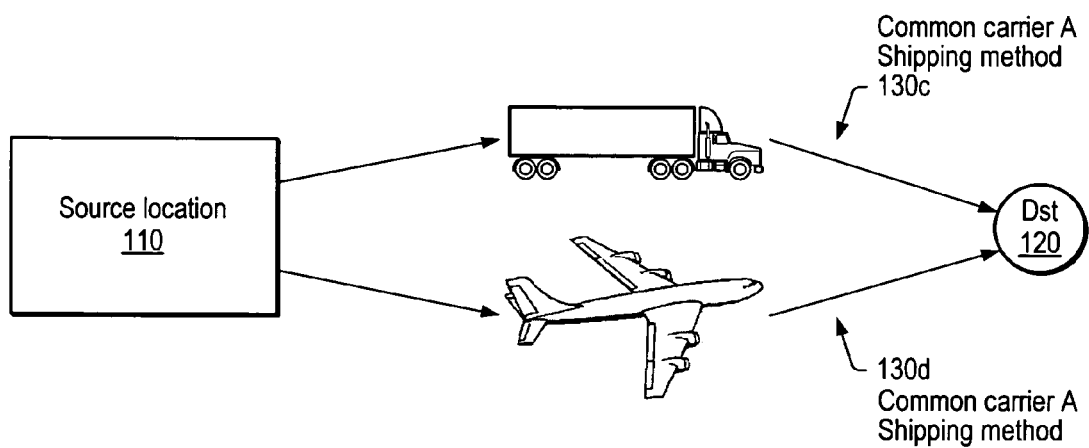

FIGS. 2A-B illustrate several exemplary embodiments of particular shipping methods 130. As illustrated in FIG. 2A, in one embodiment two different shipping methods 130*a-b* between a source location 110 and a destination location 120 may correspond to the same mode or class of transit provided by two different common carriers, A and B. For example, shipping methods 130*a-b* may correspond to a surface-based mode of transit (e.g., ground service) provided by United Parcel Service (UPS) and FedEx, respectively. By contrast, as illustrated in FIG. 2B, in one embodiment shipping methods 130*c-d* may correspond to different modes of transit provided by the same common carrier A. For example, in this embodiment shipping methods 130*c-d* may correspond respectively to UPS Ground service and UPS Two-Day Air service.

Numerous possible combinations of carriers and classes or modes of transit may exist between a source 110 and a destination 120. For example, common carriers may include DHL, the United States Postal Service, and other shipping companies as well as the postal services of other countries. Additionally, privately contracted carriers (e.g., company-owned or leased fleets) may be employed to implement shipping methods 130 as an alternative or complement to the use of common carriers. In some embodiments, for example where sources 110 and destinations 120 are located within a single facility, shipping methods 130 may include various smaller-scale procedures and resources for moving materials, such as manned push carts, trucks, conveyor systems, etc. Generally speaking, a shipping method 130 may encompass any suitable method for conveying tangible goods from one location to another on a large or small geographic scale, including common or private carriers, land, air or sea modes, etc.

Fulfillment Center and Shipping Control System

As mentioned above, in one embodiment a source 110 may correspond to a fulfillment center. Broadly speaking, a fulfillment center may be configured to receive and store inventory items of various types. In some embodiments, received inventory may be appropriately processed to the degree necessary to render it suitable for storage within the fulfillment center, for example by unpacking received shipments, inspecting items for damage, entering item status and, in some cases, unit tracking information (e.g., radio frequency identification or RFID information) into an inventory control system, and/or other tasks related to inventory receiving. Received inventory may then be stored within the fulfillment center according to an inventory storage plan. For example, the fulfillment center may include storage racks, bins, shelves or other types of storage facilities. In various embodiments, received inventory items may be distributed for storage among the storage facilities in a uniform or localized fashion, depending on the configuration of the fulfillment center, anticipated patterns of demand for the items, or other relevant factors.

Stored inventory may be picked or retrieved from within the fulfillment center for a variety of reasons. For a fulfillment center that is configured to prepare and ship items in response to customer orders, the occurrence of such orders may result in retrieval of items, although items may also be retrieved to be returned to a supplier, relocated within the fulfillment center or conveyed to a different fulfillment center, or discarded, liquidated or otherwise disposed of. For retrieved items that are intended to be shipped to a destination 120, in one embodiment a fulfillment center may include resources for packing such items into individual packages or shipments. For example, a fulfillment center may include areas, supplies and/or equipment suitable for the manual or automated packing of items for shipment.

Figure 3:
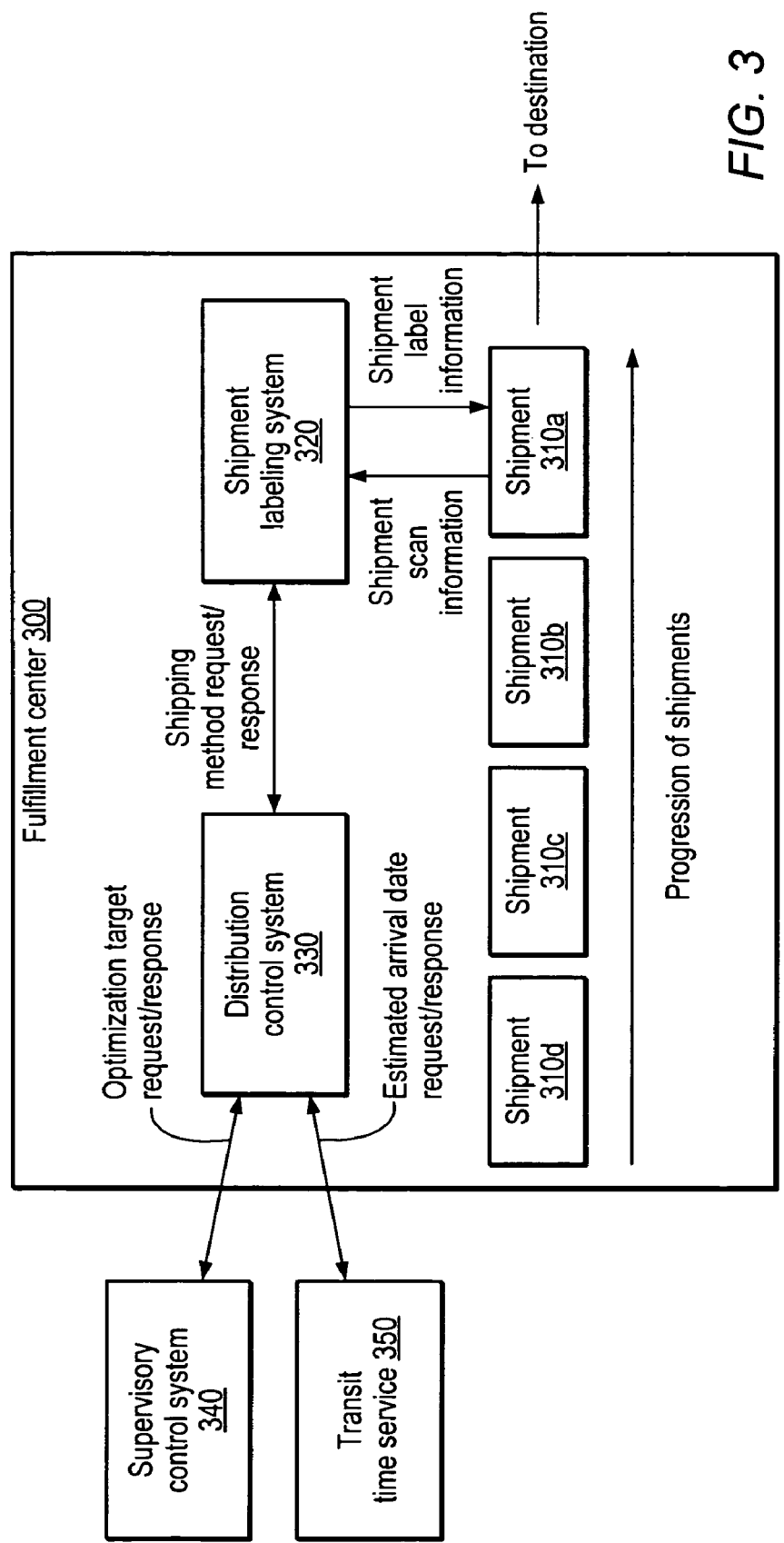
FIG. 3 is a block diagram illustrating a portion of one embodiment of a fulfillment center.

One embodiment of a portion of a fulfillment center is illustrated in FIG. 3. In the illustrated embodiment, fulfillment center 300 is shown to include a number of shipments 310*a-d*, a shipment labeling system 320 configured to interact with shipments 310, and a distribution control system 330 configured to communicate with shipment labeling system 320. Although not shown in FIG. 3, as noted above, fulfillment center 300 may include facilities for receiving and storing inventory items as well as for picking and preparing items for shipment.

In the illustrated embodiment, each shipment 310 may be suitably prepared for tendering to some type of carrier for shipment to a corresponding destination 120 according to some shipping method 130, which may be determined and assigned through the operation of shipment labeling system 320 and distribution control system 330 as described below. As shown, shipments 310 may be sequentially processed by shipment labeling system 320. For example, shipments 310 may be located on a conveyor belt or other type of transport configured to present shipments to shipment labeling system 320. Alternatively, individual ones of shipments 310 may be manually presented to shipment labeling system 320 in some order. In some embodiments, shipment labeling system 320 may be configured to concurrently process multiple shipments 310, or fulfillment center 300 may include multiple instances of shipment labeling system 320.

Generally speaking, shipment labeling system 320 may be configured to identify a particular shipment 310, determine a particular shipping method to be used for the particular shipment 310, and associate the particular shipping method with the particular shipment 310. In one embodiment, shipment labeling system 320 may include one or more software modules including instructions executable to implement the functionality of the system, for example by the exemplary computer system discussed below in conjunction with the description of FIG. 7. In some embodiments, shipment labeling system 320 may be implemented via dedicated computing hardware, while in other embodiments shipment labeling system 320 may be implemented via hardware that also implements other functionality, such as that of distribution control system 330 described below, for example.

Also, in one embodiment, shipment labeling system 320 may include or may be configured for interfacing to an input device configured to scan identifying information associated with a given shipment 310. For example, shipments 310 may be affixed with optically-readable codes such as bar codes, with RFID tags, or with other suitable types of identifying information. Correspondingly, shipment labeling system 320 may include or be interfaced to an optical bar code scanner, RFID scanner, or other suitable input device configured such that when a given shipment 310 is presented to shipment labeling system 320, the shipment's identifying information may be communicated to shipment labeling system 320. In some embodiments, the identifying information associated with a given shipment 310 may directly encode information about that shipment, such as its content, dimensions, or other characteristics. In other embodiments, the identifying information may minimally encode an identifier unique to the given shipment 310. Such an identifier may be associated with one or more records corresponding to the given shipment 310 that may be stored within fulfillment center 300 or elsewhere within the enterprise, such as in an ordering or production database. The stored record(s) may include a variety of information pertinent to the given shipment 310, including information about the shipment's contents, the status of the corresponding order, the intended destination 120 of the shipment, and/or any other information pertinent to the shipment 310 or its contents.

In response to receiving identifying information for a particular shipment 310, in one embodiment, shipment labeling system 320 may be configured to request a shipping method to be associated with the particular shipment 310 from distribution control system 330. As described in detail below, distribution control system 330 may be configured to select an appropriate shipping method for conveying the particular shipment 310 to its corresponding destination 120, taking into account characteristics of the particular shipment 310 (e.g., shipment dimensions, contents, desired arrival date, etc.), as well as shipping costs and the state of other recently shipped and/or pending shipments 310. Distribution control system 330 may be configured to consult with a supervisory control system 340 to obtain optimization targets or parameters for use in the shipping method selection process, as described below.

In one embodiment, distribution control system 330 may also be configured to consult with a transit time service 350 to obtain estimated arrival date information for various shipping methods. For example, if there is a time constraint for delivery of a shipment 310, distribution control system 330 may consult transit time service 350 to obtain estimates of delivery dates achievable by various shipping methods, and may eliminate from consideration those shipping methods indicated as unlikely to satisfy the time constraint. In some embodiments, transit time service 350 may be configured to maintain analytic or empirical models (e.g., such as may be derived from tracking data of previous shipments) representative of the expected transit latencies of various shipping methods 130 between a source 110 and a geographic area in which a destination 120 may reside, as well as a degree of probabilistic confidence or surety in a particular expected latency. Additional details about possible embodiments of transit time service 350 may be found in U.S. patent application Ser. No. 11/094,505, filed Mar. 30, 2005 and entitled "Method and System for Transit Characteristic Prediction," which is hereby incorporated by reference in its entirety. However, it is noted that in some embodiments, other implementations of transit time service 350 may be employed, or transit time service 350 may be omitted entirely.

Upon receiving an indication of the shipping method to be assigned to a particular shipment 310, shipment labeling system 320 may be configured to associate the shipping method with the particular shipment 310. For example, in one embodiment shipment labeling system 320 may include or be interfaced to an output device such as a label printer. In such an embodiment, shipment labeling system 320 may be configured to generate a shipping label indicative of the selected shipping method, which may then be manually or automatically applied to the particular shipment 310. For example, such a label may include bar code information, tracking number information, or other types of information specific to the selected carrier and shipping method. In another embodiment, shipment labeling system 320 may be configured to directly print shipping information indicative of the selected shipping method onto the particular shipment 310. In still another embodiment, the association of the selected shipping method with the particular shipment 310 may be virtual rather than physical. For example, if the carrier corresponding to the selected shipping method supports virtual shipment addressing, shipment labeling system 320 may be configured to electronically communicate a unique identifier of the particular shipment 310 to the selected carrier, additionally specifying the details of the selected shipping method. The selected carrier may then use the unique identifier of the particular shipment 310 as a proxy for a shipping label. It is noted that in some embodiments, shipment labeling system 320 may be configured to perform additional functions. For example, shipment labeling system 320 may be configured to generate a printed manifest or invoice to be included within or attached to shipments 310.

Shipping Method Selection Based on Dynamic Process Model Optimization

Figure 4:
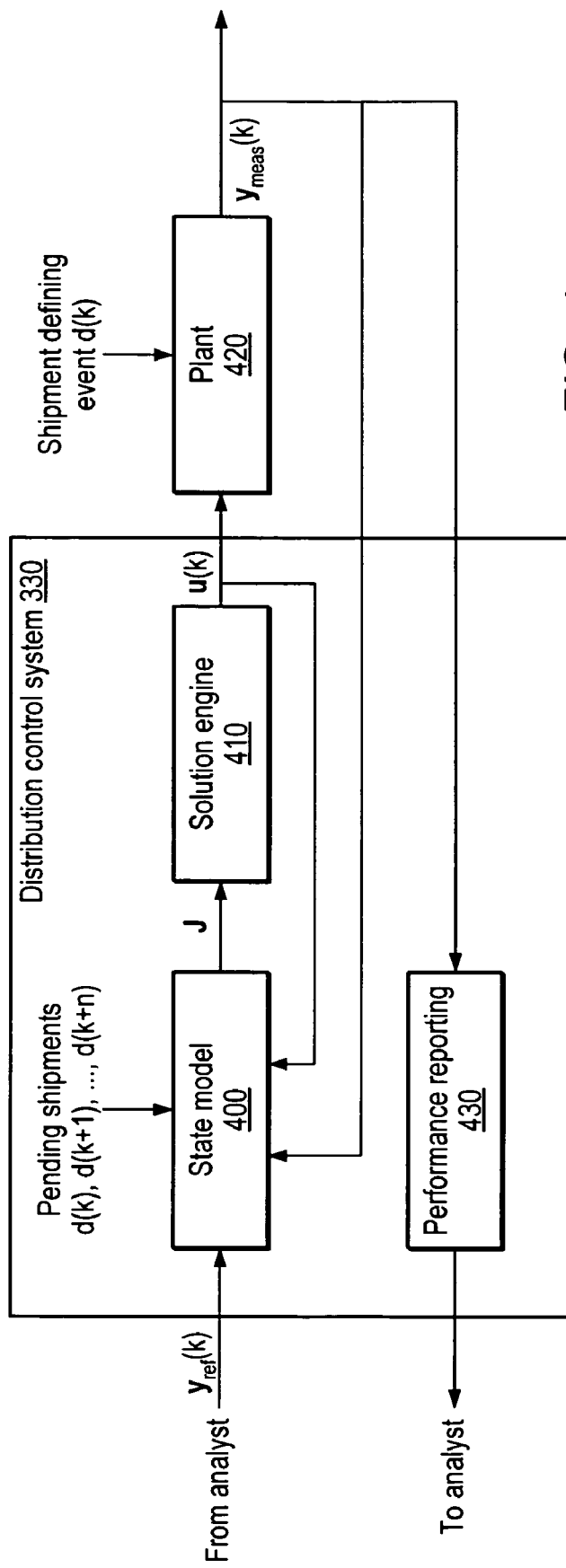
FIG. 4 is a block diagram illustrating one embodiment of a distribution control system.

In one embodiment, distribution control system 330 may be configured to implement a process model representative of historical and, in some instances, future state of shipments 310, and may further be configured to generate a shipping method selection for a given shipment 310 dependent on optimization of the process model in view of control policy constraints. One such embodiment of distribution control system 330 is shown in FIG. 4. In the illustrated embodiment, distribution control system 330 may be configured to control the operation of the process implemented by plant 420. Generally, plant 420 may represent a process, the operation of which is to be modeled and controlled by a control system such as distribution control system 330. In one embodiment, plant 420 may correspond to the shipping method assignment process implemented by shipment labeling system 320. That is, plant 420 may represent the operational elements of shipment labeling system 320 having inputs that are subject to control or manipulation and outputs or process state subject to observation. As shown in FIG. 4, distribution control system may include a state model 400 configured to receive a number of inputs and to update a discrete state space model of plant operation in response to the received inputs. Distribution control system 330 may additionally include a solution engine 410 configured to generate a selected shipping method to be assigned by shipment labeling system 320, as well as performance reporting logic 430 configured to collect and report operational statistics such as performance of the distribution control system over time.

The process model reflected by distribution control system 330 may be reflected by a set of discrete state space equations. In one embodiment, the shipping method assignment process may be modeled as a discrete event-driven process in which the process state evolves in response to shipment events. Generally speaking, a shipment event may occur when there exists a shipment 310 for which a shipping method is to be selected and assigned. For example, a shipment event may occur when a shipment 310 is presented to shipment labeling system 320 for scanning. Mathematically, a shipment event occurring at event index k may be represented as $d(k)$, where k may correspond to an integer or whole number. Shipment events may be ordered such that earlier events have smaller event indexes k than later events. Shipment events may occur at any time, and there may be an arbitrary period of elapsed time between successive shipping events. Shipment events that occur at the same time may be serialized in the shipment event index space. For example, in one embodiment a single instance of distribution control system 330 may be configured to control multiple instances of shipment labeling system 320 as a single, virtual process. In such an embodiment, two simultaneous shipment events occurring on distinct instances of shipment labeling system 320 may be serialized as two distinct events, $d(k)$ and $d(k+1)$. The serialization may occur through random selection or through application of a suitable priority algorithm that distinguishes the events.

It is noted that in some embodiments, a shipment event may be anticipated well in advance of its actual occurrence. For example, a future shipment event may be anticipated to occur in response to a customer's order placement that, subsequent to fulfillment processing such as inventory picking and packing, is expected to result in a shipment 310 being prepared and presented to shipment labeling system 320. For purposes of exposition, shipment event d(k) will be referred to as the current shipment event for which a shipping method is to be selected, e.g., the shipment event corresponding to the shipment 310 currently presented to shipment labeling system 320. Those shipment events for which a shipping method is yet to be selected may be referred to as pending events. Thus, prior to selection of a corresponding shipping method, d(k) may be considered a pending event, as are any anticipated events d(k+1), d(k+2), . . . , d(k+n). Shipment events occurring prior to d(k) may be referred to as past or historical shipment events for which shipping methods have already been selected.

One embodiment of the process model reflected by state model 400 may be developed as follows. It is noted that while the following discussion describes the implementation and manipulation of state variables using vector and matrix representations and arithmetic, in other embodiments, state model 400 may be formulated in scalar or set-theoretic terms without loss of generality. With suitable variations, the techniques and methods that follow are equally applicable to such alternative formulations.

Let x(k) be defined as an m-element vector:

$$x(k)=\{x_1(k), x_2(k), \ldots x_m(k)\}$$

where each element $x_j(k)$ of x(k) corresponds to the accumulated volume of shipments prior to event index k for a respective shipping method 130. In one embodiment, x(k) may include an element for each shipping method 130 that is valid (e.g., available for use by fulfillment center 300) as of event index k. In some embodiments, shipping methods 130 that were previously available but become unavailable or otherwise invalid may be deleted from x(k) or otherwise masked from consideration (e.g., zeroed) until and unless they become valid once again. For example, certain shipping methods 130 may become temporarily or permanently unavailable due to operational changes, quotas, service disruptions or other issues. In other embodiments, methods that are not valid for selection may be retained within x(k) indefinitely, but may be prevented from being selected by rules or constraints as described below.

Let u(k) be defined as an m-element vector:

$$u(k)=\{u_1(k), u_2(k), \ldots, u_m(k)\}.$$

where each element $u_j(k)$ of u(k) corresponds to a respective shipping method 130. Generally, u(k) may represent the shipping method 130 that is actually selected for a given shipment event d(k) occurring at event index k. In one embodiment, only one shipping method 130 may be selected for a given shipment event d(k), and correspondingly only one element $u_j(k)$ may be set equal to 1, with the remaining elements constrained to be 0. It is noted that not all possible values of u(k) may be valid for a given shipment event d(k). For example, certain shipping methods 130 may be generally invalid at event index k due to unavailability as described above. Further, other shipping methods 130 may be specifically invalid for given shipment event d(k). For example, a given shipping method 130 may not satisfy the desired delivery date, or some aspect of the shipment 310 corresponding to given shipment event d(k) such as weight, dimensions, fragile or hazardous contents, etc. may limit a given shipping method 130 from being selected. In one embodiment, the possible values of u(k) for a given shipment event d(k) may be explicitly constrained to reflect only valid shipping methods 130 for shipment event d(k), for example by requiring that all invalid methods be set to zero as a criterion for u(k) representing a valid shipping method selection. As described below, in one embodiment u(k) may be produced for a given shipment event d(k) as a result of the operation of solution engine 410.

Thus, x(k) may generally represent the current state of the shipping method decision system represented by plant 420 as of event index k and prior to selecting a shipping method for shipment event d(k). Further, u(k) may represent the shipping method decision generated for shipment event d(k). Therefore, in one embodiment, state model 400 may be configured to compute the next state of the system as a simple accumulation of the current state and the current decision:

$$x(k+1)=x(k)+u(k).$$

Additionally, in one embodiment state model 400 may be configured to transform the current state vector x(k) to represent the fractional distribution of the current system state. First, a transformation matrix T may be applied:

$$z(k)=Tx(k).$$

In some embodiments, matrix T may be defined according to the desired aggregation of individual elements of x(k). For example, as noted above, individual elements $x_j(k)$ of x(k) may correspond to respective shipping methods 130. However, it may be desired to analyze the distribution of the current system state in terms of carriers, some of which may correspond to multiple different shipping methods 130. For example, in an embodiment where x(k) has nine elements, four elements may correspond to respective shipping methods 130 of a first carrier A, two elements may correspond to a second carrier B, and three elements to a third carrier C. In such an embodiment, matrix T may be defined such that the matrix product of T and x(k) produces a vector z(k) having three elements each corresponding to a respective sums of the elements of x(k) corresponding to a respective one of carriers A, B and C. It is noted that in different embodiments, different aggregations of x(k) are possible. For example, T may be defined to aggregate similar shipping methods 130 across different carriers (e.g., to aggregate according to ground shipping, second-day air, overnight, international, etc.). It is also noted that no aggregation need be performed at all. For example, if T is defined as the identity matrix, then z(k) will be identical to x(k), and the distribution analysis may be performed on the basis of individual shipping methods rather than aggregations of shipping methods. In one embodiment, matrix T may be configured as a parameter by a user of distribution control system 330, for example according to specific business goals.

Following application of transformation matrix T, in one embodiment state model 400 may be configured to transform the resulting state vector z(k) into an output vector y(k) according to the fractional distribution of each element of z(k) across the total of the elements of z(k):

$$y(k) = \frac{z(k)}{\sum_i z_i(k)}$$

That is, each element of z(k) may be proportionally scaled by the total of all elements of z(k) by taking the ratio of the element with the total. As a result, output vector y(k) may have arbitrarily many elements, but each element may be a bounded value between 0 and 1, inclusive. As noted above, if no aggregation is performed (e.g., if T is the identity matrix), $z(k)=x(k)$ and thus $y(k)$ may represent a scaled version of $x(k)$.

In one embodiment, the current output vector $y(k)$ may be combined with other factors, such as a target value for the output vector $y(k)$, a cost associated with a discrepancy between the current and target values of $y(k)$, and costs associated with various valid shipping method options for a given shipment event $d(k)$ in order to produce an objective or cost function. Optimization of the objective function may then be performed to identify a particular shipping method 310 that minimizes the total cost of the objective function, taking into account the various cost factors modeled in the objective function. One embodiment of such an objective function may be defined as follows:

$$J = \sum_{k_0}^{k_0+n} \{(y_{ref}(k) - y(k))^T W (y_{ref}(k) - y(k)) + C(d(k))^T u(k)\}$$

Here, $y_{ref}(k)$ may denote the target or desired value of output vector $y(k)$. For example, $y_{ref}(k)$ may represent aggregated state of the shipping methods of three different carriers and may specify that the respective target fractions of shipments across the three carriers are 80%, 15% and 5%. In the objective function, the deviation or error between $y_{ref}(k)$ and $y(k)$ is effectively squared through pre- and post-multiplication of the deviation by the deviation weight matrix W. In one embodiment, W may be configured to assign a particular weight or cost to the deviation that occurs in each element of $y(k)$, and may be manipulated to tune the convergence of $y(k)$ to the target. In some embodiments, a uniform weight may be applied to the deviation in each element of $y(k)$. However, the sensitivity of the objective function to the deviation in $y(k)$ need not be identical for each component of $y(k)$ and in fact may be finely tuned on an empirical or analytical basis. In some embodiments, users of distribution control system 330 may supply matrix W as a parameter.

It is noted that in a typical feedback control system, output vector $y(k)$ may actually be measured at the output of plant 420 prior to being fed back into state model 400, as shown in FIG. 4 by the term $y_{meas}(k)$. For example, in some types of plants 420, it is possible that environmental perturbations may affect the true output of the plant in a stochastic or unpredictable way. However, in one embodiment shipment labeling system 320 may be configured to function as a deterministic plant 420. For example, once a shipping method 130 is selected for a shipment 310 by distribution control system 330, it typically will either be carried out or it will not, with no intermediate state. Further, there may be a very high probability that the selected method will be in fact be carried out. Thus, in one embodiment state model 400 may be configure to model output vector $y(k)$ internally, assuming that shipping method decision vectors $u(k)$ are performed by shipment labeling system 320 as decided without actually measuring their performance. Such an embodiment may simplify the implementation of distribution control system 330 while remaining essentially functionally equivalent (e.g., to within an error bounded by the failure rate of shipment labeling system 320) to the explicit feedback loop illustrated in FIG. 4.

The vector $C(d(k))$ may denote the vector of costs for shipping a shipment 310 corresponding to a shipment event $d(k)$ according to the shipping methods that are valid for shipment event $d(k)$. As shown, the costs may be a function of particular aspects corresponding to shipment event $d(k)$, such as the weight or dimensions of the shipment, its destination, and/or any other cost-sensitive aspects. In some embodiments, vectors $C(d(k))$ and $u(k)$ may be formatted to include only elements corresponding to shipping methods 130 that are valid for event $d(k)$, while in other embodiments, elements for invalid methods may be included but ignored or masked during analysis of objective function J.

It is noted that as shown, the objective function J may be defined not only for the current shipment event, denoted here $d(k_0)$, but may also take into account a number of pending shipment events. That is, J is defined in terms of the sum of costs of the current and a total of n pending shipment events ranging from event index $k_0$ to event index $k_0+n$. In some embodiments, the number of pending events other than the current event, which may also be referred to as the horizon of pending events, may be limited to a particular number, which may be zero. For example, J may be defined over a forward-looking horizon of at most 100 pending events, or some number of events equal to the number of shipping method assignments occurring over a fixed historical time period (e.g., the previous hour or day). In other embodiments, all pending shipment events may be encompassed by J regardless of their number. In some embodiments, only those pending shipment events satisfying certain criteria may be included in the analysis of objective function J. For example, pending shipment events may be selected for inclusion dependent upon their state of readiness or relative proximity to shipment labeling system 320, such as by distinguishing pending events that have been picked from inventory from those that have not yet been picked, distinguishing events on the basis of estimated or promised shipping or delivery dates, or other suitable criteria. It is contemplated that in some embodiments, the criteria for determining whether to include a pending event in objective function J as well as the number of pending events to consider may be parameters that may be configurable by users of distribution control system 330.

In one embodiment, state model 400 may be configured to prepare and present objective function J to solution engine 410. In turn, solution engine 410 may be configured to identify a sequence of vectors $u(k_0), \ldots, u(k_0+n)$ that minimizes the total cost of the objective function J. That is, solution engine 410 may be configured to select specific shipping methods 310 for the current shipment event $d(k_0)$ and for some number of other shipment events pending as of event $d(k_0)$, if any, such that the cost of objective function J is minimized. It is noted that in embodiments where $u(k)$ is restricted to a binary integer vector having element values of either 0 or 1, the optimization problem may be classed as a mixed integer programming (MIP) type of linear programming problem. In various embodiments, solution engine 410 may employ any suitable solution algorithm or strategy for MIP-type problems, such as branch-and-bound, branch-and-cut, branch-and-price, delayed column generation, or any other suitable technique.

It is noted that inclusion of current output vector $y(k)$ in the objective function may facilitate providing feedback control based on the historical state of shipping method decisions, and that including some number of pending shipment events beyond $d(k_0)$ may provide a degree of feedforward control. Considering future events that are not currently being decided in the selection algorithm for the current shipment event $d(k_0)$ may add a level of predictive control, allowing such future events to influence the shipping method selection of the current event. In some embodiments, a combination of feedback and feedforward or predictive control may result in a shipping method selection for shipment event $d(k_0)$ that may not be the least costly if considering shipment event $d(k_0)$ alone, but which may minimize costs in view of both historical shipment state and pending shipments.

In some embodiments, during optimization of objective function J, current output vector y(k) may be treated as purely historical state not affected by the selection of u(k). In other embodiments, the effects of a particular selection of u(k) on output vector y(k) may be incorporated into the optimization process. For example, the effect of each potentially valid decision vector u(k) may be simulated (e.g., via computing resultant values of x(k) and z(k)) to generate an expected value for y(k), the deviation of which may then be incorporated into objective function J. Further, in some embodiments where some number of pending shipment events are included in objective function J, the effects of sequentially earlier decision vectors u(k) may be imputed to sequentially later decision vectors u(k). For example, a particular value of decision vector $u(k_0)$ may influence the state of output vector $y(k_0+1)$, which may in turn influence the contribution of decision vector $u(k_1)$ to objective function J. In some embodiments, such chains of state dependencies among pending shipment events, and their effects may be simulated and accounted for during the optimization of objective function J.

In one embodiment, it is contemplated that state model 400 may be configured to store representations of the various model state vectors x(k), z(k) and y(k), in addition to computing the various functions of these vectors described above. Additionally, state model 400 may be configured to store representations of various parameters or inputs to the state-determining functions described above or to objective function J, such as aggregation matrix T, deviation weight matrix W, cost vector C(d(k)) and/or other values. Collectively, the state vectors and parameters stored or maintained by state model 400 may be referred to as the model or process model of plant 420. Such a model may be said to be dynamic to the extent that shipping method selections that depend on the model incorporate and reflect changes resulting from previous (and possibly future) shipment events as they occur, rather than relying solely on static, state-independent selection rule.

Figure 5:
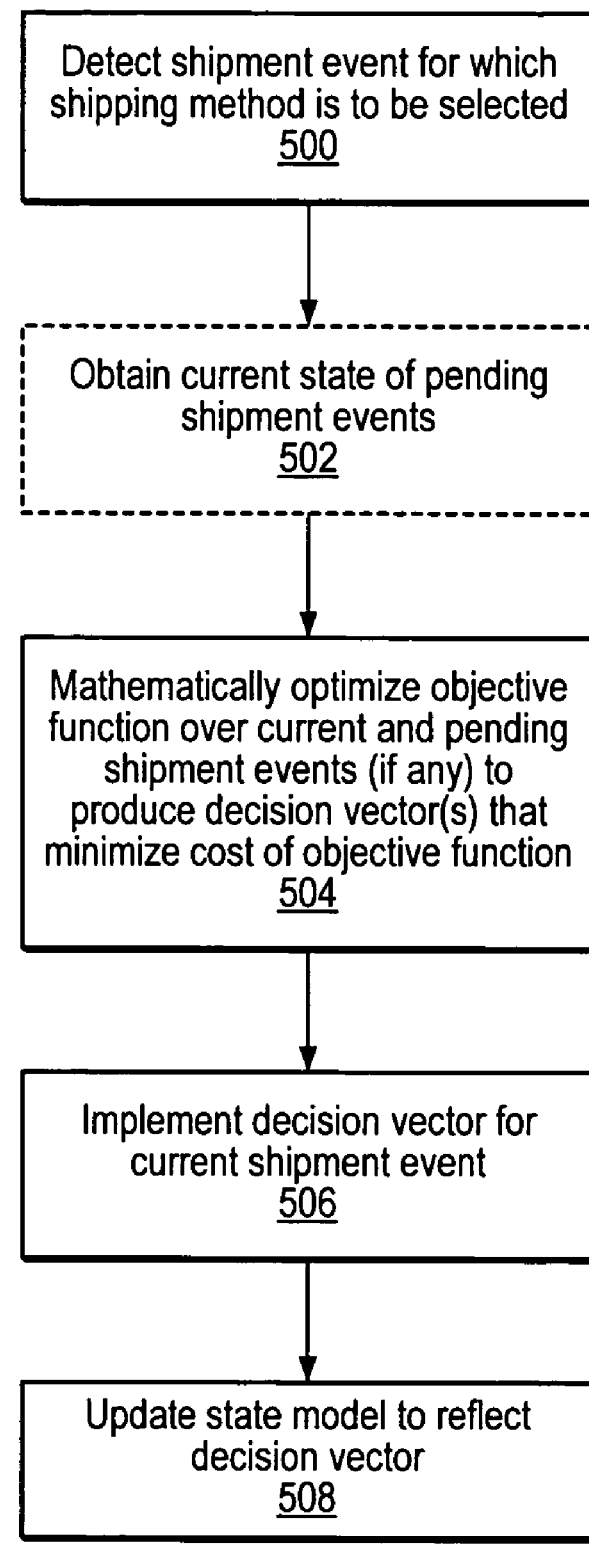
FIG. 5 is a flow diagram illustrating one embodiment of a method of operation of a distribution control system.

One embodiment of a general method of operation of distribution control system 330 is illustrated in FIG. 5. In the illustrated embodiment, operation begins in block 500 where a current shipment event d(k) is detected for which a shipping method 130 is to be selected. For example, distribution control system 330 may detect a shipping method request generated by shipment labeling system 320 in response to a particular shipment 310 being scanned or otherwise identified to shipment labeling system 320.

The current state of pending shipment events d(k+1), ..., d(k+n) may be obtained (block 502). For example, distribution control system 330 may be configured to query another system, such as supervisory control system 340, to obtain any new pending events and may evaluate pending events to select those corresponding to any applicable selection criteria, as may be specified by a user or programmed as default selection criteria. In some embodiments, distribution control system 330 may be configured to update pending shipment event state in response to detecting the shipping method selection request for shipment event d(k), while in other embodiments distribution control system 330 may be configured to monitor pending shipment event state independently of shipping method requests. As noted above, in some cases no pending shipment events beyond d(k) may be considered. In such cases, block 502 may be omitted.

The objective function J may then be mathematically optimized over the current and any pending shipment events under consideration to produce a set of decision vectors u(k), . . . , u(k+n) that minimize the cost of the objective function (block 504). For example, solution engine 410 may be configured to implement an MIP solution algorithm to optimize objective function J in view of the system and event state represented by state model 400. It is contemplated that in some embodiments, more than one decision vector u(k) may equivalently satisfy the optimization of objective function J. In such embodiments, a particular decision vector u(k) may be selected either randomly or according to additional constraints or tie-breaking criteria.

It is noted that mathematical optimization of an objective function refers to any goal-seeking solution procedure that attempts to identify solution values of one or more inputs to the objective function such that the value of objective function attains a specific goal within a solution space, and such a solution may be referred to as a value that mathematically optimizes the objective function. For example, depending on the formulation of the objective function, mathematical optimization may be performed to maximize or minimize the objective function's value or to achieve a particular target value for the objective function. Depending on the nature of the objective function and/or the optimization strategy employed, in some embodiments mathematical optimization of the objective function may be guaranteed to achieve the optimization goal, while in other embodiments the optimization may be probabilistically likely to converge to a solution. In some such embodiments, the likelihood of convergence may be bounded, and the solution may also be probabilistically likely to reside within a bounded range of values. That is, in some embodiments, an optimized solution to an objective function may be defined to satisfy an optimization criterion that specifies a range of values and/or probabilities corresponding to the solution rather than a certain, exact value. It is particularly noted that optimization of an objective function may not reflect constraints that are not reflected in the objective function or otherwise accounted for in the optimization process. That is, the extent to which a solution produced by the optimization process may be said to be "optimal" may depend on and be interpreted in view of the actual optimization constraints used.

Decision vector u(k) may then be implemented (block 506). For example, distribution control system 330 may be configured to return the shipping method 130 indicated by vector u(k) to shipment labeling system 320 as a result of as a result of the initial shipping method request. In response, shipment labeling system 320 may appropriately label the corresponding shipment 310 consistent with the selected shipping method 130 and instruct that the shipment 310 be shipped according to the selected method. It is noted that while a set of decision vectors u corresponding to pending events may be generated, in one embodiment only the decision vector u(k) corresponding to the current event may actually be implemented. Thus, it is possible that a decision vector u(k+i) determined for a pending event d(k+i) may be different from the decision vector that is determined when the shipment 310 corresponding to the pending event is actually ready to be assigned a shipping method 130. Further, it is noted that in some embodiments, decision vector u(k) may be considered implemented from the perspective of distribution control system 330 when it is returned to the requestor, irrespective of whether the requestor actually carries out an operation according to u(k).

Additionally, system state may be updated to reflect the selection of decision vector u(k) (block 508). For example, state model 400 may be configured to update vectors x(k), z(k) and y(k) in view of u(k) as described above. In some embodiments, the timing of the state model update may vary. For example, instead of updating the state model after a current decision vector u(k) has been implemented, updating of the state model may occur in response to detecting a shipment event for which a shipping method is to be selected, using a previous decision vector. Also, it is noted that in some embodiments, updating of state to reflect decision vector u(k) may occur independent of whether any operation is carried out by a requestor (e.g., shipment labeling system 320) according to u(k).

As shown in the embodiment of FIG. 4, the target vector $y_{ref}(k)$ to which distribution control system 330 may attempt to converge the system state may be specified as an external input to distribution control system 330. For example, performance reporting 430 may be configured to display trends over time of system variables, such as the behavior of state vector x(k), output vector y(k) and/or other state, output or constraint variables. An agent external to distribution control system 330, such as an analyst, may analyze the reported variables and determine whether changes to the target distribution of selected shipping methods should be implemented. For example, the analyst may take into account other variables external to those considered by distribution control system 330, such as changes in operational availability of certain shipping methods 130, and determine that the relative distribution of shipping methods as targeted by $y_{ref}(k)$ should be changed. The analyst may then provide a new value of $y_{ref}(k)$ to system 330, and future shipping method selection decisions may be generated in view of the new target.

Figure 6:
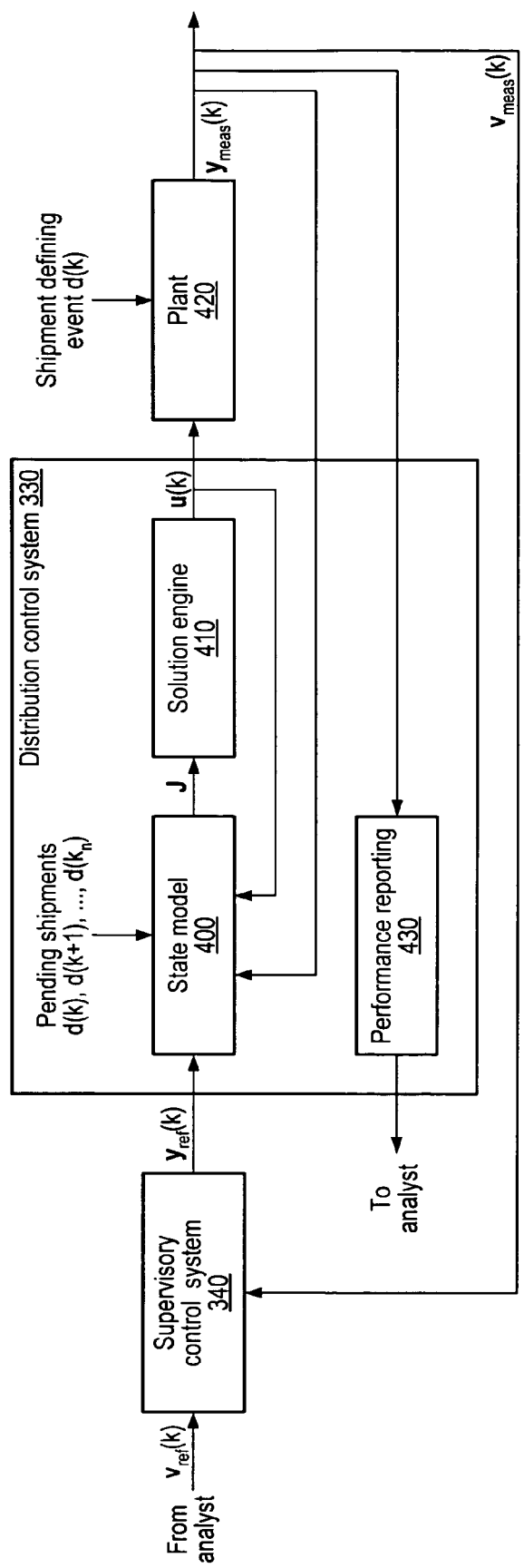
FIG. 6 is a block diagram illustrating another embodiment of a distribution control system.

In some embodiments, such as illustrated in FIG. 6, a secondary or supervisory control loop may be defined and implemented by supervisory control system 340 to dynamically generate $y_{ref}(k)$ based on constraints and state feedback provided by other measured system variables. In an exemplary embodiment, the target distribution $y_{ref}(k)$ may be constrained during a given period of time by volume limits on particular shipping methods 130 or aggregations of shipping methods 130. For example, for logistical reasons a particular carrier may limit the number of shipments 310 it will accept from a shipper during a given day, week or other time period. Thus, while business decisions (e.g., cost minimization) may suggest that the particular carrier should receive a specific proportional share of shipments 310 as measured by y(k), this goal may be subject to the volume constraint that the total number of shipments 310 to the particular carrier should not exceed the limit during a measurement period.

Correspondingly, in one embodiment supervisory control system 340 may be configured to determine an aggregated volume of shipments v(k):

$$v(k)=Ex(k)$$

where matrix E may function as an aggregation matrix similar to matrix T described above. That is, matrix E may be defined to aggregate elements of state vector x(k) by carrier, by shipping method, or in any other suitable fashion. If matrix E is the identity vector, no aggregation may be performed, and volume constraints may be considered on the basis of individual shipping methods 130. It is noted that in some embodiments, state vector x(k) may be reset at intervals. However, such intervals may not coincide with the interval over which volume constraints are measured, and in some instances, x(k) may effectively grow without bound. Correspondingly, in some embodiments the aggregated volume of shipments v(k) may be determined relative to an earlier-measured volume or an earlier measurement of state vector x(k). For example, $x_{base}(k_0)$ may be measured at the beginning of a volume measurement period and used as a baseline for volume measurements during the period, e.g.:

$$v(k)=E(x(k)-x_{base}(k_0)).$$

As noted above with respect to y(k), in embodiments where plant 420 is effectively deterministic (e.g., such that shipping method decisions u(k) have a sufficiently high probability of being carried out by shipment labeling system 320), volume v(k) may be determined from the stored system state as modeled by state model 400 rather than actually measured at plant 420. In some embodiments, it is contemplated that matrix E may be a configurable parameter that may be specified by a user of supervisory control system 340.

In various embodiments, supervisory control system 340 may implement a number of different control policies with respect to volume state v(k). For example, a reactive feedback strategy may be employed in which v(k) is compared with a constraint vector $v_{ref}(k)$ specifying measurement period constraints for each element of v(k). If any element of v(k) is equal to or greater than a corresponding element of $v_{ref}(k)$, supervisory control system 340 may be configured to adjust the target distribution $y_{ref}(k)$ accordingly, for example by zeroing the corresponding elements of $y_{ref}(k)$. It is noted that in some embodiments, adjusting $y_{ref}(k)$ may not provide an immediate response in distribution control system 330. That is, depending on the configuration of deviation cost matrix W, it may take some number of events for the system output trajectory y(k) to converge to the new $y_{ref}(k)$. Correspondingly, in some embodiments, supervisory control system 340 may also be configured to disable certain shipping methods 130 as being invalid selection options for shipping decision vector u(k). For example, by disabling those shipping methods 130 corresponding to elements of v(k) that exceed $v_{ref}(k)$, supervisory control system 340 may be able to immediately prevent any further shipments from accruing to those elements of v(k).

The above strategy may be reactive to the extent that it responds to changes in volume state that have already occurred. In some embodiments, supervisory control system 340 may be configured to adjust $y_{ref}(k)$, and possibly adjust which shipping methods 130 are enabled for future shipping decision vectors u(k), in a predictive fashion. In one embodiment, supervisory control system 340 may be configured to determine the difference between the currently measured aggregated volume v(k) and $v_{ref}(k)$, and to predictively adjust $y_{ref}(k)$ taking into account factors such as the amount of time remaining in the current volume measurement period, the production rate of plant 420 (e.g., the current rate of shipments 310 being processed shipment labeling system 320), the state of pending shipment events, and/or other suitable factors.

For example, in a simple scenario involving two carriers A and B, then at a given point in time, $y_{ref}(k)$ may specify a 90% volume target for carrier A and a 10% volume target for carrier B. However, $v_{ref}(k)$ for carrier B may specify a limit of 20,000 shipments during the measurement period. Further, as of the given point in time, 19,000 shipments may have been selected for carrier B, three hours may remain in the measurement period, and the current production rate of plant 420 may be 150 shipments per minute. In one embodiment, supervisory control system 340 may be configured to analyze these constraints to determine that, in order to meet without exceeding $v_{ref}(k)$ for carrier B during the three remaining hours, $y_{ref}(k)$ for carrier B should be reduced to approximately 3.1%, assuming the production rate remains constant. That is, to select at most 1000 shipments over three hours for carrier B results in a selection rate of approximately 5.56 shipments per minute, which corresponds to approximately 3.1% of the current production rate.

It is noted that in other embodiments, supervisory control system 340 may be configured to adjust $y_{ref}(k)$ dependent on policies in addition to or different from volume-based policies. Also, in some embodiments such control policies may include minimum or bounded constraints in addition to or instead of maximum constraints. For example, rather than constraining aggregated volume to a maximum value, in some embodiments, supervisory control system 340 may be configured to adjust $y_{ref}(k)$ to ensure that aggregated volume for a particular shipping method 130, carrier or class of methods satisfies at least a minimum constraint or is as close as possible to a target value over the measurement period. It is also noted that supervisory control system 340 may operate on a different measurement interval than distribution control system 330. For example, distribution control system 330 may be configured to evaluate and update state model 400 upon each request for selection of a shipping method for a shipment event, while supervisory control system 340 may evaluate and update $y_{ref}(k)$ considerably less often. Further, in some embodiments, supervisory control system 340 may be time-driven rather than shipping-event driven.

In one embodiment, it is contemplated that distribution control system 330 may be implemented as a computational service (e.g., a software service) that may be called on behalf of multiple individual plants 420, such as individual instances of shipment labeling system 320. In some such embodiments, distribution control system 330 may be configured to maintain separate sets of state variables for each plant 420 that is controlled. In other embodiments, distribution control system 330 may be configured to globally manage the state of multiple plants 420 as a single, virtual plant. Additionally, in some embodiments distribution control system 330 may be deployed at the fulfillment center level, such that each fulfillment center 300 includes a dedicated instance of distribution control system 330. However, in other embodiments, a single instance of distribution control system 330 may be configured to control instances of shipment labeling system 320 across different fulfillment centers 300.

Similarly, it is contemplated that in some embodiments, supervisory control system 340 may be implemented as a computational service (e.g., a software service) that may be called on behalf of multiple individual instances of distribution control system 330, and may be configured to separately manage the target state $y_{ref}(k)$ for each distribution control system 330 under control. In one embodiment, both distribution control system 330 and supervisory control system 340 may be configured to support dynamic run-time updates to any of their configurable parameters without requiring reinitialization or restarting. For example, run-time changes may be made to cost parameters such as cost vector $C(d(k))$ or weight matrix W, to aggregation matrices T or E, to target or constraint vectors such as $y_{ref}(k)$ or $v_{ref}(k)$, to the parameters defining how many and/or what types of pending shipment events are to be considered in objective function J, to parameters defining which shipping methods 130 are valid for inclusion in decision vectors $u(k)$, or to any other relevant parameters. Moreover, in some embodiments, any of these parameters may be manually defined by a user or automatically generated as the result of another control process or computational process, such as another software service, for example.

Exemplary Computer System Embodiment

It is contemplated that in some embodiments, any of the methods, techniques or components described above may be implemented as instructions and data capable of being stored by a computer-accessible storage medium. Such methods or techniques may include, for example and without limitation, the various methods of maintaining state model 400, optimizing an objective function, and selecting a shipping method as performed by the elements and flow diagrams shown in FIGS. 3-6 and described in detail above, as well as suitable variations thereof. Such instructions may be executed to perform a particular computational function, such as performing inter-process communication, implementing mathematical functions such as integration, differentiation, convolution, optimization, etc., as well as higher-order functions such as, operating system functionality, network communications functionality, application functionality, and/or any other suitable functions. It is noted that for any method described above, where no specific ordering of operations of a method is described or required, the various operations of the method may be performed in any suitable order by instructions that may be executed in any suitable order.

Figure 7:
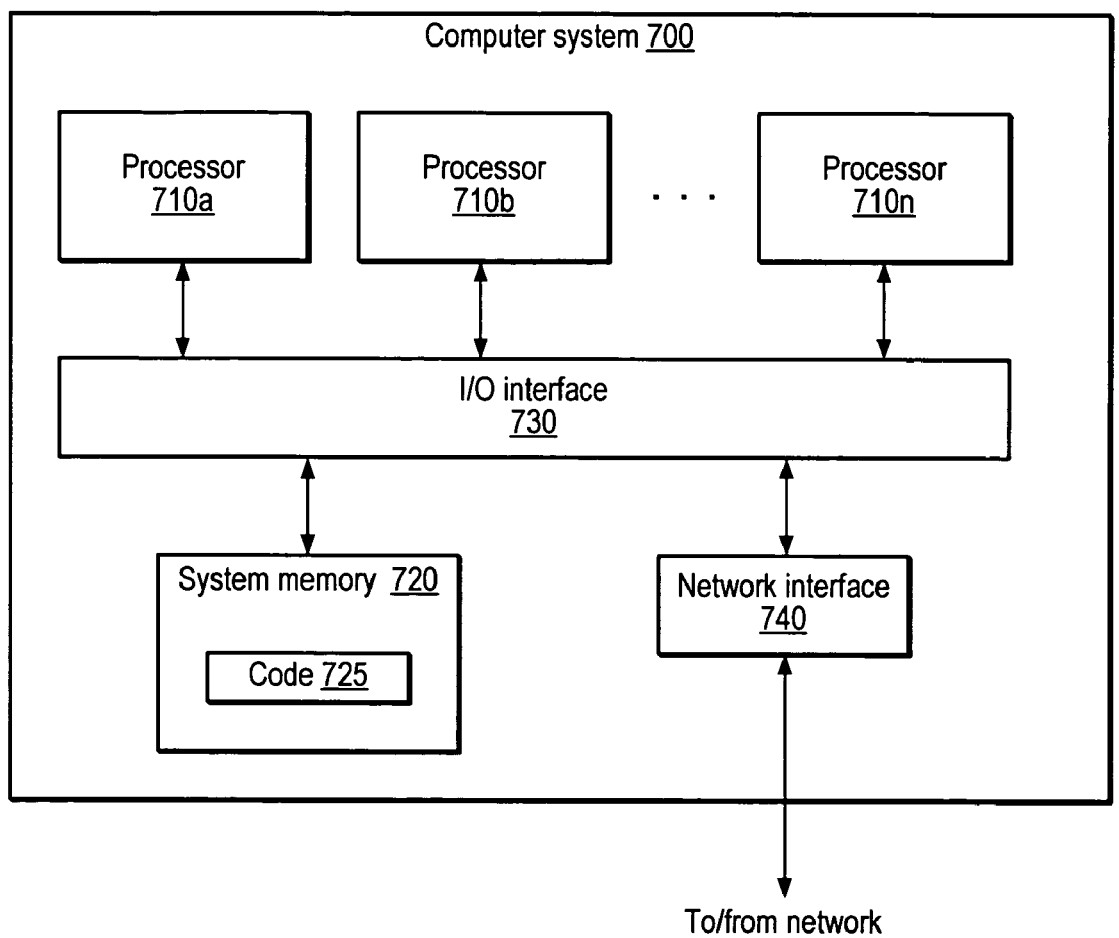
FIG. 7 is a block diagram illustrating an exemplary embodiment of a computer system.

One exemplary embodiment of a computer system including tangible, computer-accessible storage media is illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. Generally speaking, one or more instances of computer system 700, or a suitable variant thereof, may be configurable to implement any one or more of the functional elements shown in FIGS. 3-6 and/or any of the methods or techniques described above, according to any suitable functional partitioning.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC, SPARC, or MIPS ISAs, or any other suitable ISA. In multiprocessor systems, each of processors 710 may commonly, but need not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 720 as code 725. It is noted that in some embodiments, code 725 may include instructions and data implementing desired functions that are not directly executable by processor 710 but are represented or encoded in an abstract form that is translatable to instructions that are directly executable by processor 710. For example, code 725 may include instructions specified in an ISA that may be emulated by processor 710, or by other code 725 executable on processor 710. Alternatively, code 725 may include instructions, procedures or statements implemented in an abstract programming language that may be compiled or interpreted in the course of execution. As non-limiting examples, code 725 may include code specified in a procedural or object-oriented programming language such as C or C++, a scripting language such as perl, a markup language such as HTML or XML, or any other suitable language.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to network 120, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 720 may be one embodiment of a computer-accessible storage medium configured to store instructions and data as described above. However, in other embodiments, instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 700 via I/O interface 730. A computer-accessible medium may also include any volatile or non-volatile media such as RAM (e.g. SDRAM, DDR SDRAM, RDRAM, SRAM, etc.), ROM, etc, that may be included in some embodiments of computer system 700 as system memory 720 or another type of memory. A computer-accessible medium may generally be accessible via transmission media or signals such as electrical, electromagnetic, or digital signals, conveyed via a communication medium such as a network and/or a wireless link, such as may be implemented via network interface 740.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
one or more computers performing the following actions, wherein the one or more computers each comprise at least a processor and a memory:
detecting a given shipment event for which one of a plurality of shipping methods is to be selected;
determining a current output state of a discrete event model representative of shipping method selections for one or more previous shipment events; and in response to detecting said given shipment event, for each of the given shipment event and one or more pending shipment events that occur subsequent to the given shipment event, producing a selection of a corresponding one of said plurality of shipping methods such that the selections of shipping methods for the given shipment event and the one or more pending shipment events collectively mathematically optimize an objective function, such that producing the selection for the given shipment event depends on both the given shipment event and the one or more pending shipment events;
wherein said objective function is dependent on respective costs of shipping associated with said given shipment event and said one or more pending shipment events, and is further dependent on a weighted deviation between said current output state of said discrete event model and a target output state of said discrete event model; and
wherein the one or more pending shipment events correspond to one or more shipments that have not yet been presented for shipment labeling.

2. The method as recited in claim 1, further comprising shipping a shipment associated with said given shipment event according to said particular shipping method.

3. The method as recited in claim 1, further comprising updating said discrete event model to reflect selection of said particular shipping method for said given shipment event.

4. The method as recited in claim 1, wherein said discrete event model includes a current model state representation including respective indications of accumulated volumes of shipments for each of said plurality of shipping methods as selected for said one or more previous shipment events.

5. The method as recited in claim 4, wherein determining said current output state of said discrete event model includes determining one or more aggregations of ones of said respective indications of accumulated volumes of shipments selected according to a selection criterion and including an indication of said one or more aggregations in said current output state.

6. The method as recited in claim 5, wherein determining a given one of said one or more aggregations of ones of said respective indications of accumulated volumes of shipments selected according to a selection criterion comprises associating a respective carrier with said given aggregation and selecting indications of accumulated volumes of shipments for said given aggregation that correspond to said respective carrier.

7. The method as recited in claim 5, wherein determining a given one of said one or more aggregations of ones of said respective indications of accumulated volumes of shipments selected according to a selection criterion comprises associating a respective shipping method type with said given aggregation and selecting indications of accumulated volumes of shipments for said given aggregation that correspond to said respective shipping method type.

8. The method as recited in claim 5, wherein determining said current output state of said discrete event model includes proportionally scaling each of said one or more aggregations of ones of said respective indications by a total of said one or more aggregations.

9. The method as recited in claim 1, wherein selecting said one or more pending shipment events includes selecting a user-configurable number of said pending shipment events.

10. The method as recited in claim 1, wherein selecting said one or more pending shipment events occurs dependent upon said one or more pending shipment events satisfying one or more user-specified criteria.

11. The method as recited in claim 1, wherein said target output state of said discrete event model is specified by a user.

12. The method as recited in claim 1, further comprising dynamically generating said target output state of said discrete event model dependent upon one or more state elements of said discrete event model and one or more constraints.

13. The method as recited in claim 1, wherein a weighting of said weighted deviation between said current output state of said discrete event model and said target output state of said discrete event model is user configurable.

14. The method as recited in claim 1, wherein producing said selection of said particular shipping method comprises applying a mixed integer programming (MIP) solution algorithm to said objective function.

15. A non-transitory computer-accessible storage medium that stores instructions, wherein the instructions are executable to:
  detect a given shipment event for which one of a plurality of shipping methods is to be selected;
  determine a current output state of a discrete event model representative of shipping method selections for one or more previous shipment events; and
  in response to detecting said given shipment event, for each of the given shipment event and one or more pending shipment events that occur subsequent to the given shipment event, produce a selection of a corresponding one of said plurality of shipping methods such that the selections of shipping methods for the given shipment event and the one or more pending shipment events collectively mathematically optimize an objective function, such that production of the selection for the given shipment event depends on both the given shipment event and the one or more pending shipment events;
  wherein said objective function is dependent on respective costs of shipping associated with said given shipment event and said one or more pending shipment events, and is further dependent on a weighted deviation between said current output state of said discrete event model and a target output state of said discrete event model; and
  wherein the one or more pending shipment events correspond to one or more shipments that have not yet been presented for shipment labeling.

16. The computer-accessible storage medium as recited in claim 15, wherein the instructions are further executable to instruct that a shipment associated with said given shipment event be shipped according to said particular shipping method.

17. The computer-accessible storage medium as recited in claim 15, wherein the instructions are further executable to update said discrete event model to reflect selection of said particular shipping method for said given shipment event.

18. The computer-accessible storage medium as recited in claim 15, wherein said discrete event model includes a current model state representation including respective indications of accumulated volumes of shipments for each of said plurality of shipping methods as selected for said one or more previous shipment events.

19. The computer-accessible storage medium as recited in claim 18, wherein to determine said current output state of said discrete event model, the instructions are further executable to determine one or more aggregations of ones of said respective indications of accumulated volumes of shipments selected according to a selection criterion and include an indication of said one or more aggregations in said current output state.

20. The computer-accessible storage medium as recited in claim 19, wherein to determine a given one of said one or more aggregations of ones of said respective indications of accumulated volumes of shipments selected according to a selection criterion, the instructions are further executable to associate a respective carrier with said given aggregation and select indications of accumulated volumes of shipments for said given aggregation that correspond to said respective carrier.

21. The computer-accessible storage medium as recited in claim 19, wherein to determine a given one of said one or more aggregations of ones of said respective indications of accumulated volumes of shipments selected according to a selection criterion, the instructions are further executable to associate a respective shipping method type with said given aggregation and select indications of accumulated volumes of shipments for said given aggregation that correspond to said respective shipping method type.

22. The computer-accessible storage medium as recited in claim 19, wherein to determine said current output state of said discrete event model, the instructions are further executable to proportionally scale each of said one or more aggregations of ones of said respective indications by a total of said one or more aggregations.

23. The computer-accessible storage medium as recited in claim 15, wherein to select said one or more pending shipment events, the instructions are further executable to select a user-configurable number of said pending shipment events.

24. The computer-accessible storage medium as recited in claim 15, wherein the instructions are further executable to select said one or more pending shipment events dependent upon said one or more pending shipment events satisfying one or more user-specified criteria.

25. The computer-accessible storage medium as recited in claim 15, wherein the instructions are further executable to receive said target output state of said discrete event model as specified by a user.

26. The computer-accessible storage medium as recited in claim 15, wherein the instructions are further executable to dynamically generate said target output state of said discrete event model dependent upon one or more state elements of said discrete event model and one or more constraints.

27. The computer-accessible storage medium as recited in claim 15, wherein a weighting of said weighted deviation between said current output state of said discrete event model and said target output state of said discrete event model is user configurable.

28. The computer-accessible storage medium as recited in claim 15, wherein to produce said selection of said particular shipping method, the instructions are further executable to apply a mixed integer programming (MIP) solution algorithm to said objective function.

29. A system, comprising:
  a memory configured to store instructions; and
  one or more processors coupled to said memory, wherein the instructions are executable by at least one of the one or more processors to:
    detect a given shipment event for which one of a plurality of shipping methods is to be selected;
    determine a current output state of a discrete event model representative of shipping method selections for one or more previous shipment events; and
    in response to detecting said given shipment event, for each of the given shipment event and one or more pending shipment events that occur subsequent to the given shipment event, produce a selection of a corresponding one of said plurality of shipping methods such that the selections of shipping methods for the given shipment event and the one or more pending shipment events collectively mathematically optimize an objective function, such that production of the selection for the given shipment event depends on both the given shipment event and the one or more pending shipment events;

wherein said objective function is dependent on respective costs of shipping associated with said given shipment event and said one or more pending shipment events, and is further dependent on a weighted deviation between said current output state of said discrete event model and a target output state of said discrete event model; and wherein the one or more pending shipment events correspond to one or more shipments that have not yet been presented for shipment labeling.

* * * * *